United States Patent Office 2,810,895
Patented Oct. 22, 1957

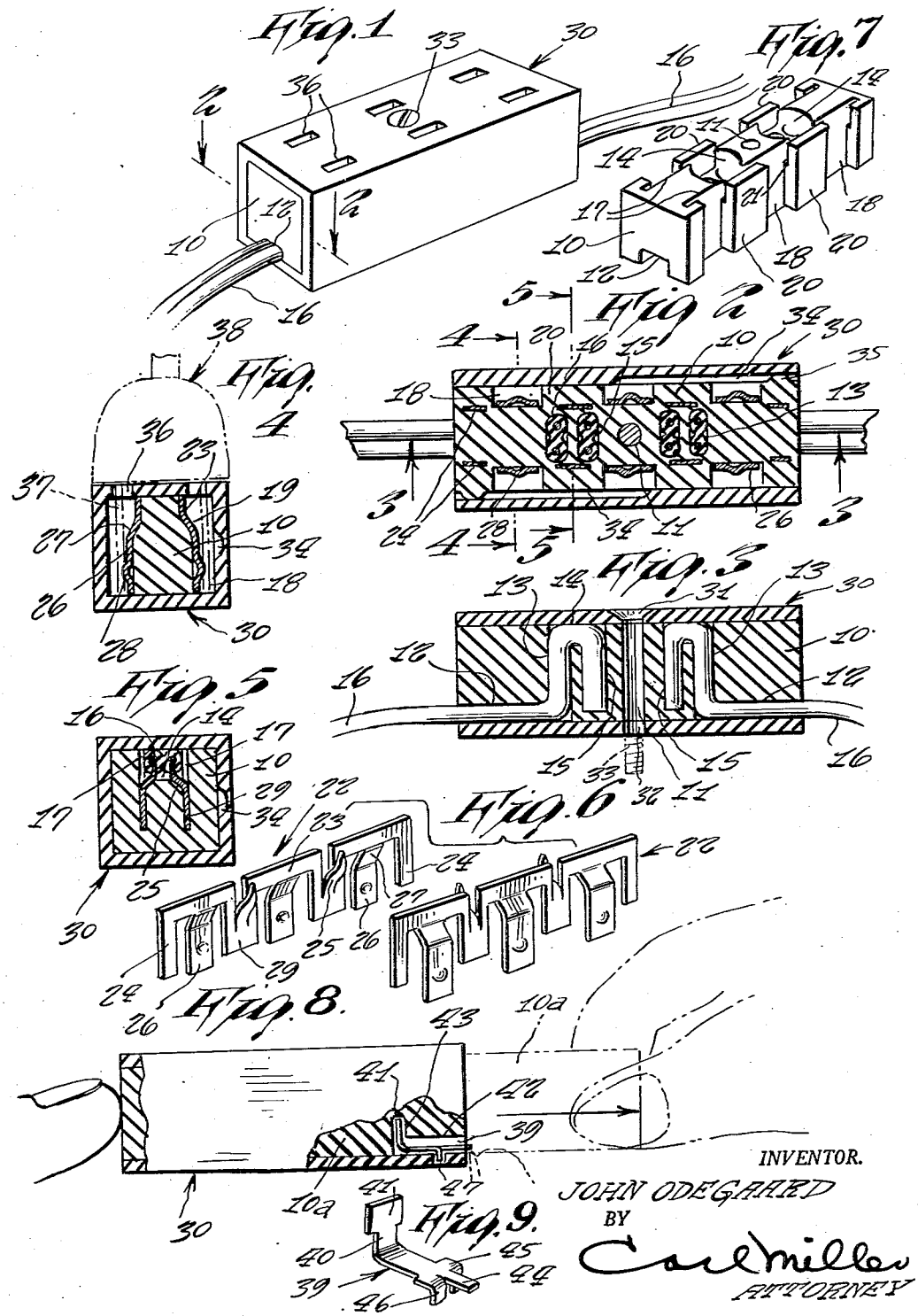

2,810,895

ELECTRIC TRIPLE OUTLET HAVING INSULATION PIERCING MEANS FOR CONTACTING THE CONDUCTOR OF AN ELECTRIC CORD

John Odegaard, Brooklyn, N. Y.

Application October 31, 1955, Serial No. 543,749

5 Claims. (Cl. 339—163)

This invention relates to electrical outlets, and proposes certain improvements in my Patent No. 2,720,635, dated October 11, 1955.

It is an object of the present invention to provide a sealed plastic triple electrical outlet.

It is another object of the present invention to provide an electrical outlet of the above type which includes three outlets.

It is still another object of the present invention to provide an electrical outlet of the above type including a plastic housing into which is press fitted by a wedging action a plastic core which receives therewithin longitudinally the electrical cords and wherein conductor members are positioned on the core and include piercing contact points which pass inwardly through the cord to penetrate the conductors, the piercing contact points being further urged into engagement with the electrical cord by the wedging action of the housing.

For other objects and for a better understanding of the invention, reference may be had to the following detailed description taken in connection with the accompanying drawing, in which:

Figure 1 is a perspective view of a preferred embodiment of the present invention;

Fig. 2 is a longitudinal sectional view thereof, taken along the line 2—2 of Fig. 1;

Fig. 3 is a longitudinal sectional view taken along the line 3—3 of Fig. 2;

Fig. 4 is a transverse sectional view taken along the line 4—4 of Fig. 2;

Fig. 5 is a transverse sectional view taken along the line 5—5 of Fig. 2;

Fig. 6 is a perspective view of the conductor members; and

Fig. 7 is a perspective view shown alone of the core; and

Fig. 8 is a side view shown partly in elevation and partly in section, of a modified form of the present invention; and Fig. 9 is a perspective view shown alone, of the modified locking member of Fig. 8.

Referring now more in detail to the drawing, 10 represents an elongated core of substantially square cross section formed of plastic and having a transverse central mounting opening 11 therethrough, substantially as illustrated.

The core member 10 (Fig. 3) at each end on the undersurface thereof is provided with the inwardly extending grooves 12, the grooves 12 being enlarged laterally and communicating with the lower end of the laterally enlarged vertical bore 13. The upper end of the bores 13 connect with the horizontal grooves 14 provided on the upper surface of the core and which in turn communicates with the inner vertical bores 15 which terminate short of the bottom of the core (Fig. 3). The ends of the insulated electrical cord 16 are adapted to pass inwardly through grooves 12 upwardly through the bores 13 across the grooves 14 and downwardly into the bores 15, as shown in Fig. 3.

The core 10 on the upper surface thereof inwardly of the sides is provided with a pair of laterally spaced, longitudinally aligned slots 17 which extend substantially from length to length thereof and which communicate with the grooves 14 (Fig. 7). The core 10 along each side is provided with three laterally aligned longitudinally spaced vertical grooves 18 which communicate at their upper ends with the slots 17 along the cam surface 19, Fig. 4, and define thereby the ridges 20. It will be seen from Fig. 7 that the slots 17 extend downwardly a limited extent, forming with the ridges 20 the shoulders 21. The opposite ends of the slots 17, however, are elongated vertically for a purpose which will hereinafter become clear.

As shown in Fig. 6, a pair of resilient strips of conductive material indicated generally at 22 are provided and each include the elongated strip 23 integrally formed at its ends with the depending fingers 24, the fingers 24 being received in the ends of slots 17 while the body portion 23 is received within the slots 17 to rest on shoulders 21. Each of the strips 23 is stamped inwardly with the inwardly and upwardly extending contact prongs 25 which extend inwardly and upwardly into the grooves 14 (Fig. 5) when the conductors are in position within the core. The strip 23 is also integrally formed intermediate the prongs 25 and fingers 24 with the depending portions 26 which are laterally spaced outwardly from the body portion 23 by means of the downwardly and outwardly sloping portions 27 which, it will be noted, (Fig. 4) abut the cam surfaces 19, the depending fingers 26 being formed with the hemispherical projections 28. Each of the slots 17 in lateral alignment with the ridges 20 is extended downwardly to receive therewithin the depending portions 29 integrally formed in the body 23 and from which the prongs 25 are stamped. Thus, when the conductors 16 are inserted in the bores 13, 15, the portions thereof within the grooves 14 will be pierced by the upwardly projecting, laterally spaced pairs of prongs 25 to embed themselves into the conductor portions (Fig. 5).

A plastic housing indicated generally at 30 is provided of substantially rectangular cross section, open at both ends. The top wall of the housing is provided with a countersunk opening 31 adapted to be aligned with the upper end of the bore 11, while the bottom wall of the housing is provided with the opening 32 aligned therewith by means of which the outlet may be mounted by means of the mounting screw 33 (Fig. 3). The sides of the housing 30 on the inner faces thereof are provided with the inwardly extending grooves 34 (Fig. 2) extending inwardly from opposite ends on opposite sides and which receive therewithin the projections 35 integrally formed in core 10. The inner faces of the housing 30 will effect a wedging action on the conductors 16 within grooves 14 whereby to pierce the insulated covering more completely when the core is in complete position within the housing, as shown in Fig. 1. The top wall of the housing 30 is also provided with three longitudinally spaced sets of laterally spaced, elongated openings 36 aligned vertically with the grooves 18 whereby to permit the insertion through the housing of the male elements 37 of three male plugs indicated generally at 38.

The sharp contact points 25 will pierce the insulation of the conductors 16, this contact, or piercing action, being further augmented by the wedging action of the sides of the housing 30 as the core is inserted therewithin.

In operation, the insulated cords 16 are inserted into the grooves 12, bores 13, grooves 14 and downwardly into bores 15 after the resilient conductors 22 have been positioned within slots 17 to permit the contact points 25 to pierce the insulation. The assembly is then pushed through the open end of the housing 30, the sides of the housing by a wedging action further piercing the insulation and securing the contact points 25 in operative position. It will be noted that the device has two piercing contacts on each side and can make contact with two sets of wires 16 for a continuation to another outlet. After the core in inserted within the housing, the mounting screw 33 is then brought into position to secure the assembly.

Referring now particularly to Figs. 8, and 9, there is shown a modified form of the present invention wherein the mounting openings and mounting screw are replaced by a resilient strip indicated generally at 39 integrally formed at its inner end with the upwardly extending portion 40 which terminates in the enlarged upper end 41, the strip 39 being received within the corresponding groove 42 provided on the undersurface of core 10a at one end thereof. The upwardly extending portions 40 and 41 are received in vertical groove 43. The strip 39 at its other end is integrally formed with the outwardly depending finger 44 as well as the laterally enlarged portion 45 having the depending laterally spaced fingers 46 which are adapted to be received within corresponding grooves 47 provided in the bottom wall of housing 30. By pushing the finger 44 upwardly, the depending fingers 46 will be removed from groove 47 to permit the outward movement of the core 10a. However, the normal resiliency of the strip 39 will retain the core locked within the housing, as will be obvious.

While various changes may be made in the detail construction, it shall be understood that such changes shall be within the spirit and scope of the present invention as defined by the appended claims.

Having thus set forth and disclosed the nature of my invention, what is claimed is:

1. A triple electrical outlet comprising an elongated longitudinal core member of insulated material, a pair of longitudinal parallel resilient conductors, said core member comprising positioning means for said pair of conductors, said core member further comprising axially aligned longitudinal bores extending inwardly from opposite ends thereof and terminating short of the center of said core member, each of a first pair of parallel transverse bores communicating with one of said inwardly extending bores at the inner ends thereof, each of a second pair of parallel transverse bores being parallel to one of said first pair of transverse bores and being disposed inwardly thereof, each of a third pair of bores connecting adjacent ends of one of each of said first and second pairs of transverse bores, said resilient conductors being carried by said core member in spaced relationship to said third pair of bores and having contact points struck inwardly and extending into said third bores, and a housing of insulated material, said core being removably received within said housing, and said housing having at least three pairs of laterally and longitudinally spaced slots communicating with said conductors and adapted to receive therethrough the dual elements of at least three male plugs.

2. An electrical outlet according to claim 1, each of said resilient contact members comprising an elongated strip integrally formed at opposite ends with depending fingers, a pair of depending portions integrally formed in said strip intermediate said fingers, said contacts being struck from said depending strips, and at least three longitudinally spaced depending portions integrally formed in said strip intermediate said first depending portions and fingers and being offset laterally with respect to said strips along and upwardly and outwardly extending portion, said positioning means comprising said core along one face having a pair of laterally spaced, longitudinal grooves adapted to receive said strips therewithin, the ends of said grooves being elongated vertically and adapted to receive said fingers therewithin, said core at the sides thereof having longitudinally spaced vertical grooves communicating at their upper ends with said slots along an inwardly and upwardly extending cam surface, said grooves defining ridges and being adapted to receive therewithin said depending offset portions, said ridges having grooves adapted to receive said contact portions downwardly therewithin.

3. An electrical outlet according to claim 2, said core having a transverse mounting opening intermediate said second transverse bores, said housing having openings aligned with said transverse bore whereby to receive therethrough a mounting member.

4. An electrical outlet according to claim 3, said housing slots being aligned vertically with said grooves and being adapted to receive therewithin the dual male members of an electrical plug in electrical contact with said offset depending portions.

5. An electrical outlet according to claim 2, including a spring member carried by said core at one end thereof and having depending fingers adapted to receive within corresponding grooves provided in said housing whereby to lock said core and housing together, said resilient member being movable to inoperaive position manually to disengage said core and housing.

References Cited in the file of this patent

UNITED STATES PATENTS

| | | |
|---|---|---|
| 2,705,309 | Bramming | Mar. 29, 1935 |
| 2,709,246 | Abbott | May 24, 1955 |
| 2,717,365 | Greenbaum | Sept. 6, 1955 |
| 2,720,635 | Odegaard | Oct. 11, 1955 |